US008317096B2

(12) United States Patent
Mysore

(10) Patent No.: US 8,317,096 B2
(45) Date of Patent: Nov. 27, 2012

(54) SMART CARD TERMINAL SIDE DATA AND MANAGEMENT FRAMEWORK

(75) Inventor: Shivaram H. Mysore, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 846 days.

(21) Appl. No.: 11/486,578

(22) Filed: Jul. 14, 2006

(65) Prior Publication Data

US 2008/0011828 A1 Jan. 17, 2008

(51) Int. Cl.
*G06K 5/00* (2006.01)
(52) U.S. Cl. .................. 235/382; 235/380; 235/492
(58) Field of Classification Search .............. 235/379, 235/380, 382, 492
See application file for complete search history.

(56) References Cited

U.S. PATENT DOCUMENTS

| 6,038,551 | A  | * | 3/2000 | Barlow et al. ............ 705/41 |
| 6,547,150 | B1 | * | 4/2003 | Deo et al. ............... 235/492 |
| 6,718,319 | B1 | * | 4/2004 | Fisher et al. ............... 1/1 |
| 6,837,426 | B2 |   | 1/2005 | Tidball et al. |
| 2005/0039041 | A1 | | 2/2005 | Shaw et al. |
| 2005/0198233 | A1 | | 9/2005 | Manchester et al. |

FOREIGN PATENT DOCUMENTS

| JP | 2000-347869 A | 12/2000 |
| JP | 2006-040098 | 2/2006 |
| RU | 2173478 C2 | 9/2001 |
| RU | 2357282 C2 | 5/2009 |

OTHER PUBLICATIONS

PCT Application No. PCT/US2007/015706 : International Preliminary Report on Patentability and Written Opinion, Jan. 14, 2009, 5 pages.
PCT Application No. PCT/US2007/015706 : International Search Report of the International Searching Authority, Dec. 28, 2007, 2 pages.

* cited by examiner

*Primary Examiner* — Kristy A Haupt
(74) *Attorney, Agent, or Firm* — Woodcock Washburn LLP

(57) ABSTRACT

A data and management framework of a smart card terminal functions to provide interoperability between the smart card terminal and a smart card, and in particular between applications of the terminal and the card. An application program interface (API) is written to the data and management framework, which is part of a smart card terminal infrastructure that accesses and processes, by the smart card terminal, a smart card application contained on the smart card. The API provides information related to the smart card application to the terminal in order to allow a corresponding terminal application to incorporate the information for communication between the two applications. Additionally, a security model and policies related to the smart card may be enforced by the smart card terminal.

20 Claims, 6 Drawing Sheets

SMART CARD TERMINAL INFRASTRUCTURE 300

TERMINAL APPLICATIONS 305

DATA AND MANAGEMENT FRAMEWORK 310

CRYPTOGRAPHIC SECURITY COMPONENT 320

ADDITIONAL CRYPTOGRAPHIC SECURITY COMPONENT 325

SMART CARD BASE CRYPTOGRAPHIC SERVICE PROVIDER 330

SMART CARD KEY STORAGE PROVIDER 335

CARD MODULE 340a

CARD MODULE 340b

CARD MODULE 340c

CARD MODULE 340d

SMART CARD RESOURCE MANAGER 345

PC/SC – winscard.h 350

PC/SC READER DRIVER 355a

PC/SC READER DRIVER 355b

FIG. 3

SMART CARD TERMINAL SIDE DATA AND MANAGEMENT FRAMEWORK

BACKGROUND OF THE INVENTION

A smart card is an electronic card containing memory and a processor, similar to a computer, for storing, processing, receiving, and transferring data. In addition to their compact size, smart cards are further desirable because they are tamper-resistant and employ a security model, allowing for sensitive and personal data to be securely carried and stored. They are thus frequently utilized for identification purposes, financial transactions, and security access applications. Other applications that require or may be enhanced by the secure handling and storage of data may also employ smart cards.

A smart card terminal is a device that accepts and reads the data contained on a smart card and thus accesses applications stored on the smart card. For example, use of a monetary smart card at a financial smart card terminal allows for money to be transferred to an account of a user of the smart card, and an identification smart card inserted in a smart card terminal located at a facility may provide access to the facility to a user of the identification smart card.

Presently, for a smart card containing one or more than one application, difficulties exist in the discovery of the smart card applications at the terminal. The terminal may not be aware of the interface provided by and the protocol used by the smart card applications. The discovery issues create difficulty in the production of applications on the terminal end. Additionally, the security model of a smart card is not enforced on the terminal. Thus a feature enforcing the security model of a smart card at the terminal, while further allowing the terminal to obtain relevant information necessary for running the applications of the smart card, is highly desirable. Further desirable enhancements to smart cards and smart card terminals include error and usage management control.

SUMMARY OF THE INVENTION

Interoperability between a smart card and a smart card terminal accessing an application of the smart card is provided by a data and management framework. An application program interface (API) may be written to the data and management framework, which is part of a smart card terminal infrastructure. The smart card terminal infrastructure accesses, processes, and implements the smart card application contained on the smart card. The API provides necessary information related to the smart card application to the terminal in order to allow a corresponding terminal application to be developed. The corresponding terminal application may then incorporate the information for interoperability, discovery, and security between the terminal and smart card applications. A security model and policies related to the smart card may be enforced by the smart card terminal.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter.

BRIEF DESCRIPTION OF THE DRAWINGS

The foregoing summary and the following detailed description are better understood when read in conjunction with the appended drawings. Exemplary embodiments are shown in the drawings, however it is understood that the embodiments are not limited to the specific methods and instrumentalities depicted therein. In the drawings:

FIG. 3 is a block diagram representing an exemplary smart card terminal infrastructure;

DETAILED DESCRIPTION OF ILLUSTRATIVE EMBODIMENTS

Figure 1:
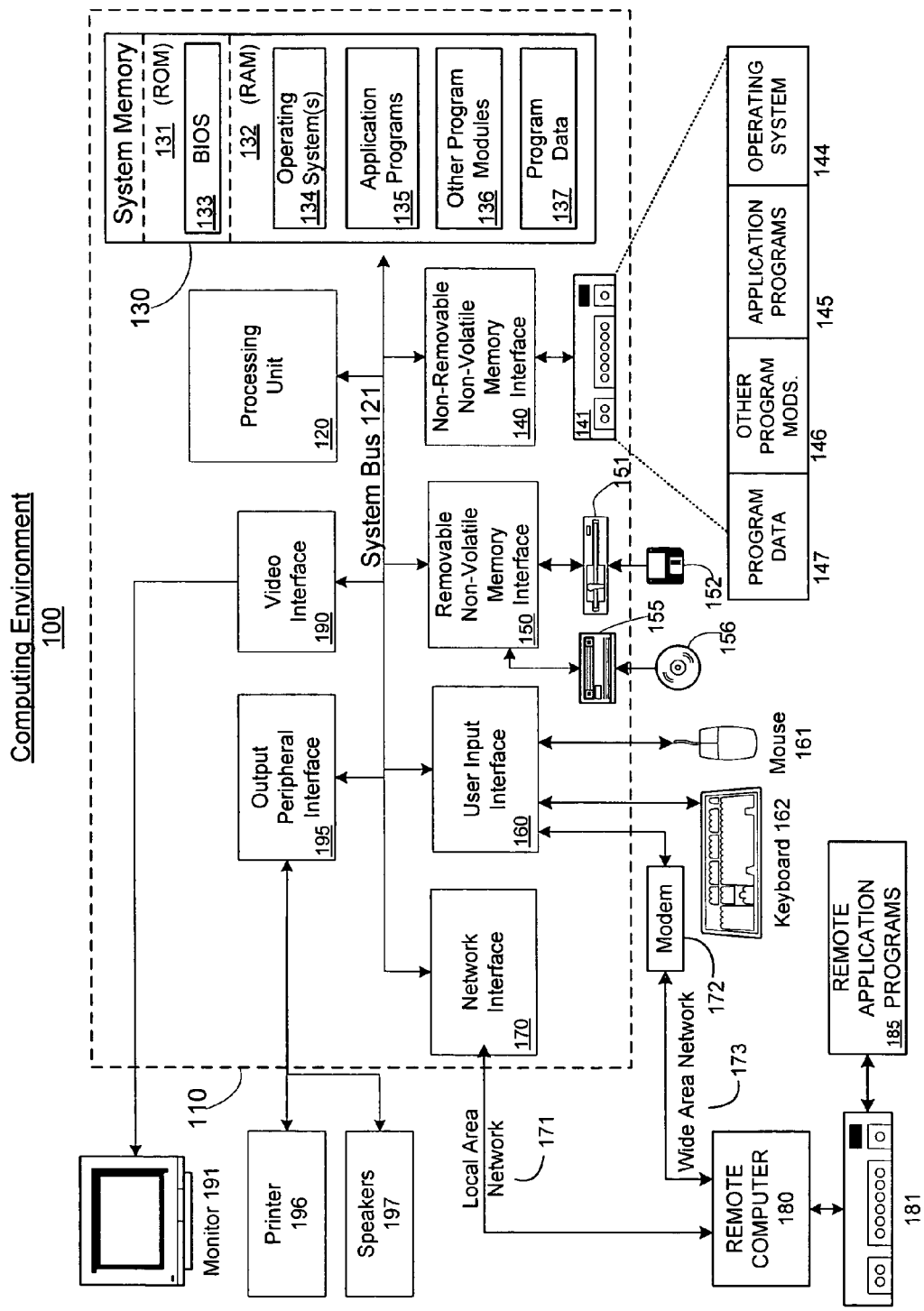
FIG. 1 is a block diagram representing an exemplary computing device.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 110 typically includes a variety of computer readable media. Computer readable media can be any available media that can be accessed by the computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or presently being operated on by the processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as an interface 140, and the magnetic disk drive 151 and the optical disk drive 155 are typically connected to the system bus 121 by a removable memory interface, such as an interface 150.

The drives and their associated computer storage media, discussed above and illustrated in FIG. 1, provide storage of computer readable instructions, data structures, components, program modules and other data for the computer 110. In FIG. 1, for example, the hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and a pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

All or portions of the methods described herein may be embodied in hardware, software, or a combination of both. When embodied in software, the methods, or certain aspects or portions thereof, may be embodied in the form of program code that when executed by a computing system cause the computing system to perform the methods. This program code may be stored on any computer-readable medium, as that term is defined above.

A smart card terminal is a device that accesses and processes applications stored on a smart card, which is a small electronic card containing memory and a processor. A smart card may be similar to a computer, and functions to store, process, receive, and transfer data. A smart card may contain one or more applications, which may be accessed for processing by the smart card terminal.

Figure 2:
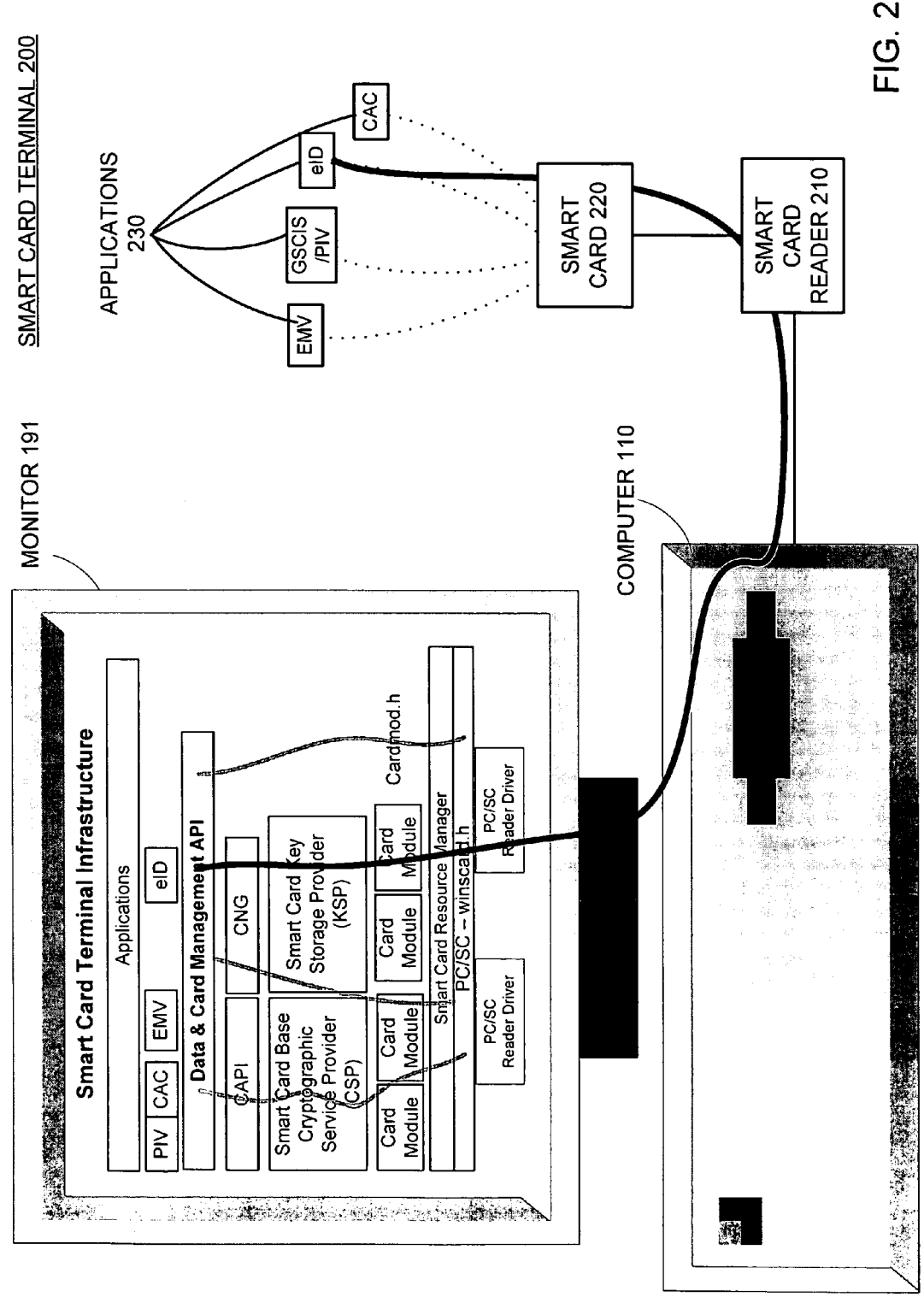
FIG. 2 is a block diagram representing an exemplary smart card terminal.

An exemplary smart card terminal 200 is shown in FIG. 2. The smart card terminal 200 may include a computer, such as the computer 110, a monitor 191 or other type of display device, and a smart card reader 210. The smart card reader 210 operates as an interface between the computer 110 and the smart card, such as the smart card 220 shown in FIG. 2, thus allowing the computer 110 to access and process the applications 230 of the smart card 220.

The smart card reader 210 may be a proximity, or contactless, smart card reader 210, where the smart card 220 is read by the smart card reader 210 without any direct contact between the reader 210 and the card 220. For example, the proximity smart card reader 210 may access the smart card 220 when the smart card 220 is held or positioned near the proximity smart card reader 210. In an embodiment, the standard ISO 14443 may be used to define a proximity smart card 220 and the proximity smart card reader 210 for compatibility with other cards 220 and readers 210 adhering to the standard ISO 14443. The proximity smart card reader 210, according to the standard, is a radio frequency identification (RFID) reader including an embedded microcontroller and a magnetic loop antenna in order to read the smart card 220. The magnetic loop antenna operates at a radio frequency of 13.56 MHz. The proximity smart card reader 210 may read the proximity smart card 220 if the card 220 is within 4 inches of the reader 210. Furthermore, the standard ISO 14443 includes four parts: (i) physical characteristics; (ii) radio frequency power and signal interface; (iii) initialization and anti-collision; and (iv) transmission protocols.

Alternatively, the smart card reader 210 may be an insertable smart card reader 210. If the smart card reader 210 is of the insert-able type, access to the applications 230 of the smart card 220 is granted when the smart card 220 or a portion of the smart card 220 is inserted in the insert-able smart card reader 210. ISO 7816 is an established standard describing contact smart cards, such as an insert-able smart card 220. The insert-able smart card 220 may be designed according to the requirements of the standard ISO 7816, which include criteria related to contents of the messages, commands, and responses transmitted between the card 220 and the reader 210; access methods to files and data in the card 220; and methods for secure messaging. Other types of smart card readers 210 may be employed, and there is no limitation to a proximity smart card reader 210 or a insert-able smart card reader 210.

The smart card 220 may contain one or more than one application 230. For example, as shown in FIG. 2, the smart card 220 includes four applications 230: EMV (Europay MasterCard Visa), GSCIS/PIV, eID, and CAC. Other applications 230 and number of applications 230 are possible. Additionally, the smart card 220 may contain unrelated applications 230 and/or may instead contain several variations of an application 230. Any combination of applications 230 may be contained on the smart card 220.

A smart card terminal infrastructure 300 according to an embodiment is shown in FIG. 3. The smart card terminal infrastructure 300 operates to access, process, and implement the applications 230 of the smart card 220. Furthermore, the infrastructure 300 allows for the management of error conditions and a usage model.

The smart card terminal infrastructure 300 may include several means, devices, software, and/or hardware for performing functions, including terminal applications 305; a data and management framework 310; a cryptographic security component 320; an additional cryptographic security component 325; a smart card base cryptographic service provider 330; a smart card key storage provider 335; one or more card module 340 (such as the card modules 340a-d as shown); a smart card resource manager 345; a PC/SC-winscard.h 350; and one or more reader driver 355 (such as the reader driver 355a and 355b).

The cryptographic security component 320 allows developers to add cryptographic security to applications, such as the terminal applications 305. The cryptographic security component 320 allows for the creation and exchange of documents and other data in a secure environment over a non-secure media, for example the internet. The additional cryptographic security component 325 may provide similar but enhanced functionality as the cryptographic security component 320. In an exemplary and non-limiting embodiment, the cryptographic security component 320 may be a CryptoAPI. In an additional exemplary and non-limiting embodiment, the cryptographic security component 325 may be CNG, or a next generation CryptoAPI The smart card base cryptographic service provider 330 may operate to communicate with individual smart cards, such as the smart card 220, through the smart card modules 340. The smart card base cryptographic service provider 330 may contain implementations of cryptographic standards and algorithms to ensure cryptographic security. The smart card base cryptographic service provider 330 may include a dynamic-link library (DLL), which may implement functions and serve as a facilitator of communication between an operating system and the smart card base cryptographic service provider 330.

The smart card modules 340 may function to translate the characteristics of particular smart cards, by communication with the smart cards through the smart card resource manager 345, into a uniform interface for the smart card terminal interface infrastructure 300. The smart card module 340 may be implemented as a DLL. The smart card key storage provider 335 functions to perform key storage operations as required by the smart card terminal data infrastructure 300.

The smart card resource manager 345 may be responsible for the task of managing access to smart card readers 210 and to smart cards 220. Some performed functions may include the identification and tracking of resources; the allocation of readers and resources across multiple applications; and the support of transaction primitives for accessing services available on a given smart card 220. The smart card resource manager 345 may be accessed directly through a resource manager API or indirectly through a smart card service provider. The resource manager API is a set of functions that provide direct access to the services of the smart card resource manager 345.

Figure 4:
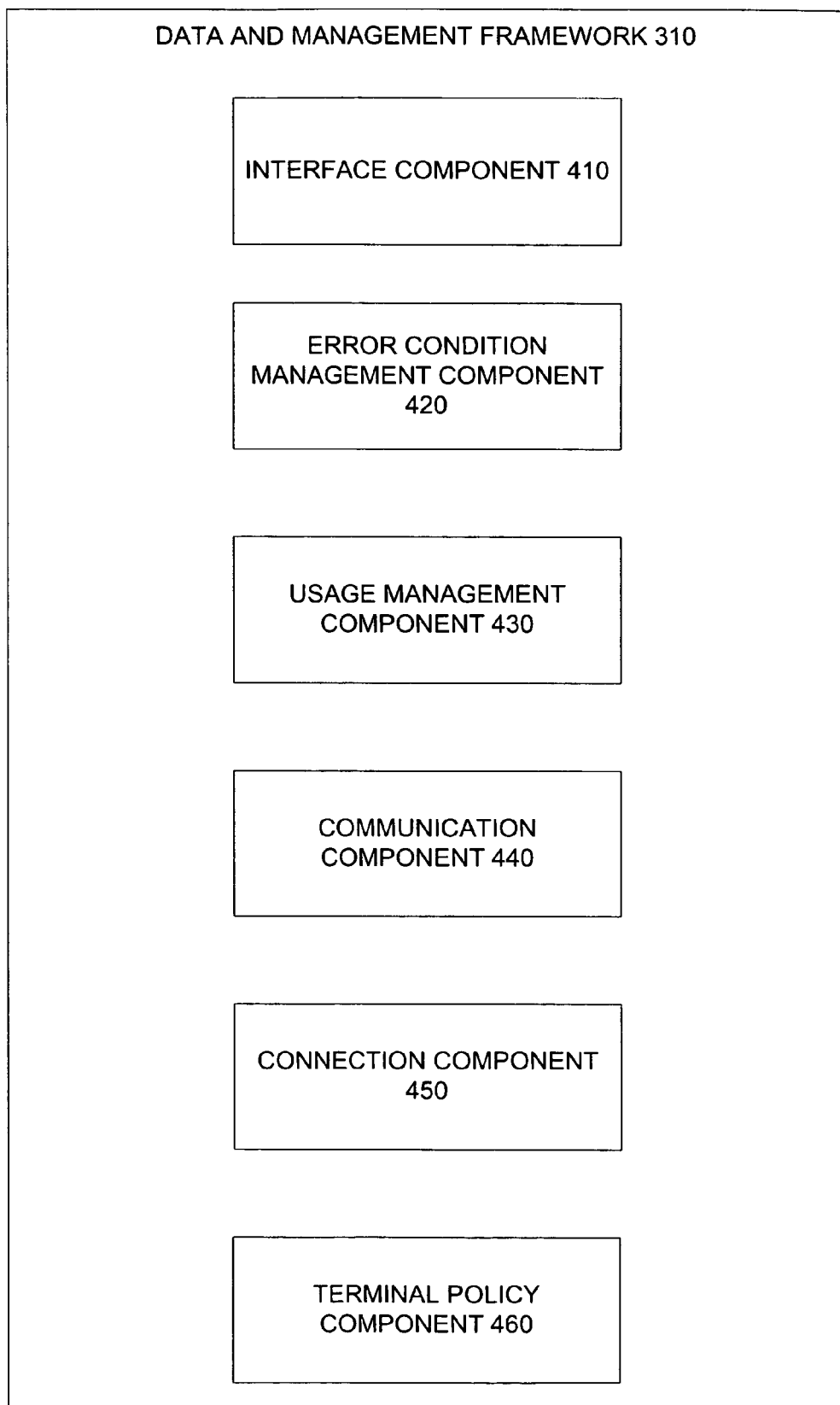
FIG. 4 is a block diagram representing a data and management framework.

The data and management framework 310 of the smart card terminal infrastructure 300 functions to assist in the development and creation of the terminal applications 305. The terminal applications 305 correspond to smart card applications 230. The data and management framework 310 may also manage error conditions as well as a usage model for communications between the smart card terminal 200 and the smart card 220. Additionally, the data and management framework 310 may be an application program interface (API) and, in an embodiment, may be responsible for the propagation of error messages to the terminal applications 305. A data and management framework 310 according to an embodiment is shown in FIG. 4.

The exemplary data and management framework 310 includes several means, devices, software, and/or hardware for performing functions, including an interface component 410, an error condition management component 420, a usage management component 430, a communication component 440, a connection component 450, and a terminal policy component 460.

The interface component 410 functions as a link from the smart card terminal 200 to a smart card application 230 by obtaining information related to the smart card application 230. The information related to the application 230 may include an interface and/or a protocol of the application 230, which may assist the terminal 200 in properly identifying and accessing the application 230 of the smart card 220. Additionally, the information may also be used to enforce a policy of the smart card 220 by making the terminal 200 aware of the existence and requirements of the policy.

A corresponding API, which corresponds to the smart card application 230, may be created by for example a vendor or developer of the smart card application 230, and the corresponding API may be written, by the vendor or developer, to the data and management framework 310. The interface component 410 may use this corresponding API to create a terminal application 305 corresponding to the smart card application 230.

The error condition management component 420 functions to detect an error related to the use of smart card 220 and, upon detection of the error, to relay a corresponding error message. The error message may be relayed to the communication component 440. Various errors may result from an attempt by the smart card terminal 200 to access the smart card application 230 of the smart card 220. For example, the card 220 may be improperly inserted in the smart card terminal reader 210. If this error is detected by the error condition management component 420, the error is accordingly relayed to the communication component 440. Another error may result when the smart card terminal 200 attempts to read an application 230 that is not on the smart card 220. Again, the error condition management component 420 may detect this error and then operate to relay an appropriate error message to the communication component 440 upon detection of the error.

The usage management component 430 may enforce a usage policy related to the smart card 220. In an embodiment, the usage policy is the security model for the smart card 220. The usage policy may be included in the information related to the smart card application and may thus be incorporated in the corresponding API written to the data and management framework 310. The usage policy may be dependent on group policy settings, local machine policy settings, or application policy settings, for example. The usage policy may be enforced by the usage management component 430, which may obtain the usage policy and monitor the usage of the smart card 220 and its applications 230. If the defined usage policy is violated, the usage management component 430 may enforce the policy by not allowing the attempted action to be processed. Additionally, the usage management component 430 may operate to relay usage information, which may be a violation message, to the communication component 440 upon detection of a violation of the usage policy related to the smart card 220.

The communication component 440, for communicating between the smart card 220 and the smart card terminal 200, may be a further feature of the exemplary data and management framework 310. As mentioned above, both the error condition management component 420 and the usage management component 430 may relay information to the communication component 440. The received information may include an error detection, a usage policy violation, or another type of communication. If the error condition management component 420 detects an error related to the use of the smart card 220 and sends an indication of this error to the communication component 440, the communication component 440 may display on the monitor 191 of the smart card terminal 200 the error message. The error message may include instructions for a user of the smart card 220 and the terminal 200. The communication component 440 may further display an indication of the violation of the usage policy related to the smart card, as reported by the usage management component 430. This indication may also be displayed on the monitor 191.

The communication component 440, upon receipt of an indication of an error condition or a usage violation, may create a log entry of the error or violation. The communication component 440 may send a message to an application, for example, in order to provide an indication to the application of the error condition or usage violation. The message sent to the application may, for example, produce a sound or tone to serve as an alert that the message was sent.

In an embodiment, the data and management framework 310 may also include the connection component 450, which may operate to create a channel between the smart card application 230 and the corresponding terminal application 305 if no error is detected and/or the usage policy is enforced. The created channel may be a secure channel between the terminal 200 and the card 220.

The terminal policy component 460 may be included in the data and management framework 310 in order to incorporate additional policies and/or restrictions on the processing of the smart card application 230. For example, a developer of the terminal application 305 may wish to establish a time limit on the use of the terminal 200 for a particular application 230. Additional policies and/or restrictions may be incorporated.

Figure 5:
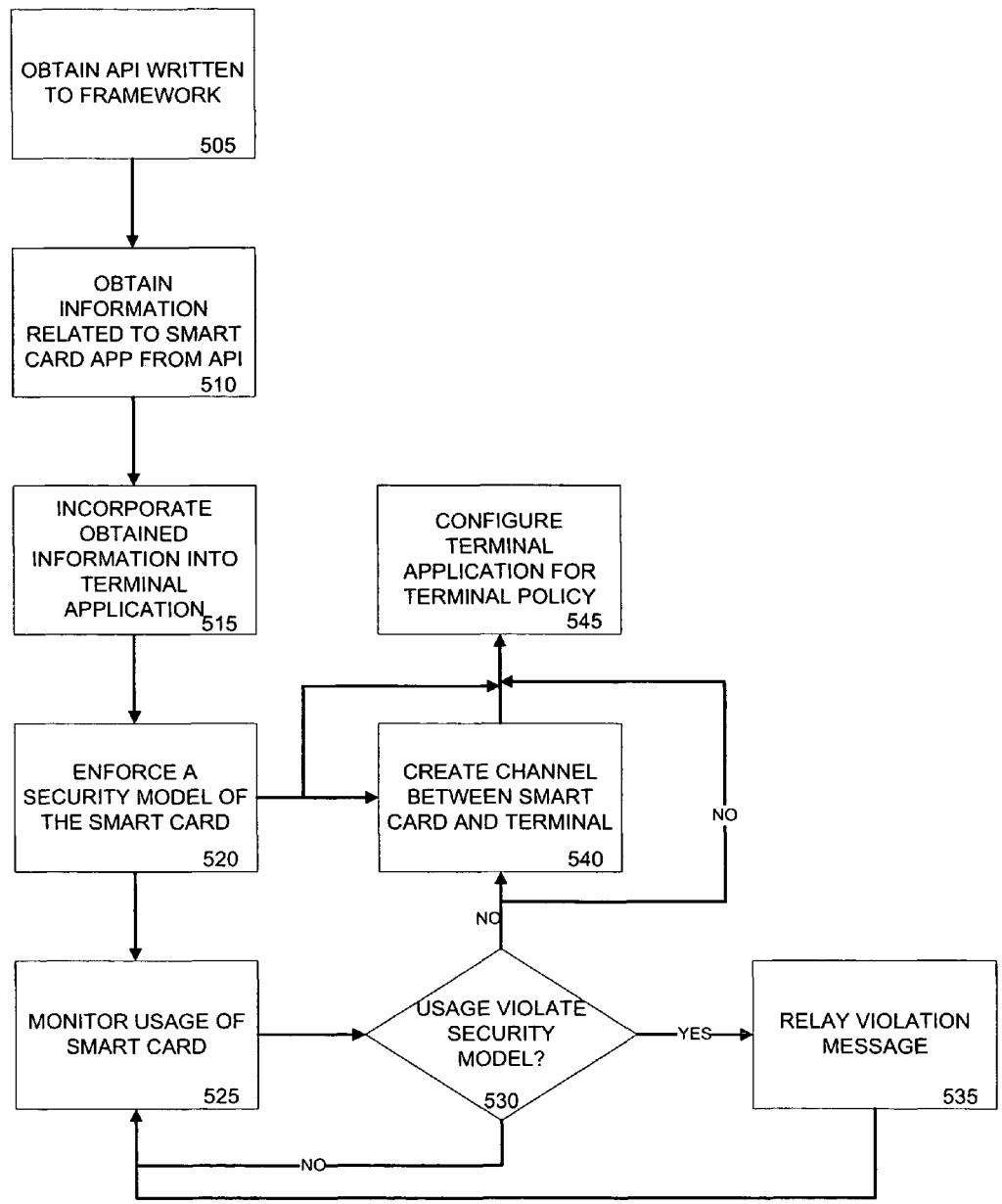
FIG. 5 is a flow diagram illustrating one embodiment of an interoperability method between a smart card terminal application and a smart card application on a smart card.

FIG. 5 illustrates an example interoperability method between a smart card terminal application 305 and a smart card application 230 on a smart card 220. The interoperability method may be implemented by a smart card terminal application developer in order to have the terminal application 305 seamlessly operate with a smart card application 230 residing on a smart card 220 inserted in the smart card terminal reader 210.

At 505, an API written to a data and management framework 310 of the smart card terminal 200 is obtained. The API corresponds to the smart card application 230. In order to create the corresponding terminal application 305, information relating to the smart card application 230 is used. At 510, this information is obtained from the API. The information related to the smart card application 230 may include, but is not limited to, an interface of the smart card application 230, a protocol used by the smart card application 230, and a security model of the smart card 220. At 515, the obtained information related to the smart card application 230 is incorporated, by for example the interface component 410 of the data and management framework 310, into the terminal application 305 that corresponds to the smart card application 230. After the terminal application 305 is created by incorporating the information related to the smart card application 230, various supplemental and optional data and management operations may be implemented by the data and management framework 310.

At 520, the security model of the smart card 220, which may be obtained as part of the information related to the smart card application 230, may be enforced. At 525, the enforcement operation may further include monitoring a usage of the smart card 220 at the terminal 200. The monitoring operation may be concurrent with an analysis of a security model, or usage policy, of the smart card 220. At 530, a determination is performed, by for example the usage management component 430, in order to ascertain if the monitored usage violates the security model. At 535, if the security model is violated, then a violation message may be relayed. The violation message may be relayed by displaying a message on a display device, such as the monitor 191, by creating a log entry of the violation, or by the transmittal of a message to an application, for example. The message sent to the application may, for example, produce a sound or tone to serve as a notification that the message was sent. Any combination of relaying the error message may be performed.

Following the relay of the violation message, the method may proceed back to 525 to further monitor the usage of the smart card 220. If, as determined at 530, the model is not violated, then further determinations may be made in order to determine if the security model is violated at a later time.

At 540, following 520 and/or 530, if the security model is not violated by the smart card 220, a secure communication channel between the smart card 220 and the smart card terminal 200 may be created. The channel may be made after the security model of the card 220 is enforced and/or after a determination that the model has not been violated in order for the smart card 220 and the terminal 200 to securely communicate and perform the intended functions of the smart card 220. For example, after the data and management framework 310 determines that a predefined security model is not being violated, the secure communication channel may be created, by for example the connection component 450.

At 545, the smart card terminal application may be configured to further define a terminal policy and/or a terminal restriction. The terminal policy component 460 may perform the configuration in order to establish and incorporate additional policies and/or restrictions on the use of the smart card 220 and/or the processing of the smart card application 230.

The configuration may be performed following 520, 530 if it is determined that a security model of the smart card 220 has not been violated, and/or 540.

Figure 6:
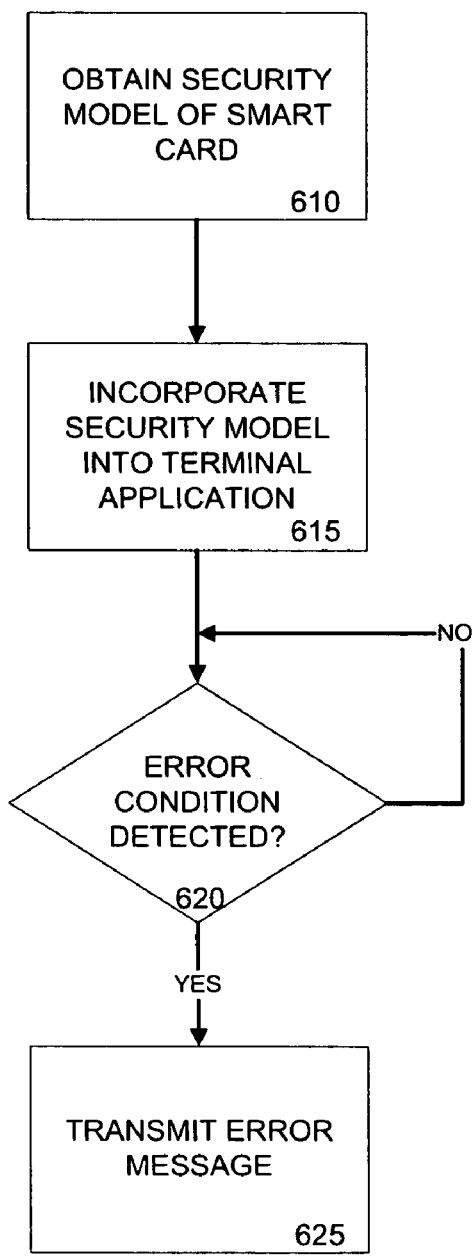
FIG. 6 is a flow diagram illustrating one embodiment of a method of enforcing a security model of a smart card on a smart card terminal.

FIG. 6 illustrates an example method of enforcing a security model of a smart card 220 on a smart card terminal 200. At 610 the security model of the smart card 220 is obtained from a data and management framework 310 of the terminal infrastructure 300. Obtaining the security model of the smart card 220 from the framework 310 may include reading an API that is applied or written to the data and management framework 310. The data and management framework 310 of the smart card terminal infrastructure 300 may function to assist in the development and creation of a terminal application 305. The terminal application 305 corresponds to a smart card application 230.

At 615, the security model is incorporated into the smart card terminal application 305, which is developed to correspond to the smart card application 230. At 620, a determination is made to ascertain if an error condition, which may be defined by the security model, is detected. This detection may be periodically or continuously performed in order to detect error conditions. At 625, upon detection of the error condition at 620, an error message corresponding to the detected error condition is transmitted. The error condition management component 420 may perform the error condition detection and may, upon detection of an error, transmit notification of the error to the communication component 440. The communication component 440 may relay the error message by displaying a corresponding message on a display device, such as the monitor 191, by creating a log entry of the error, or by the transmittal of a message to an application, for example. The message sent to the application may, for example, produce a sound or tone to serve as a notification that the error message was sent. Any combination of relaying the error message may be performed.

As can be appreciated, the disclosed embodiments may be implemented as a whole or in part in one or more computing systems or devices. FIG. 1 illustrates the functional components of one example of a computing system 100 in which aspects may be embodied or practiced. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, handheld computers, programmable consumer electronics, multimedia consoles, game consoles, satellite receivers, set-top boxes, automated teller machines, arcade games, mobile telephones, personal digital assistants (PDAs) and any other processor-based system or machine. The terms "program code" and "code" refer to any set of instructions that are executed or otherwise processed by a processor. Program code and/or data can be implemented in the form of routines, programs, objects, modules, data structures and the like that perform particular functions.

It is noted that the foregoing examples have been provided merely for the purpose of explanation and are in no way to be construed as limiting. While the inventions have been described with reference to various embodiments, it is understood that the words which have been used herein are words of description and illustration, rather than words of limitation. Further, although the embodiments have been described herein with reference to particular means, materials, and examples, the embodiments are not intended to be limited to the particulars disclosed herein; rather, the embodiments extend to all functionally equivalent structures, methods and uses, such as are within the scope of the appended claims.

What is claimed:

1. An interoperability method between a smart card terminal application and a smart card application on a smart card, the method comprising:
   obtaining an application program interface written to a framework of a smart card terminal;
   obtaining by one or more computer processors information related to the smart card application from the application program interface;
   providing by the one or more computer processors the information obtained from the application program interface for developing the smart card terminal application in accordance with the smart card application; and
   using the one or more computer processors to generate the smart card terminal application by incorporating the information obtained from the application program interface into the smart card terminal application.

2. The interoperability method of claim 1, wherein obtaining information related to the smart card application from the application program interface comprises obtaining at least one of (i) an interface of the smart card application; (ii) a protocol used by the smart card application; and (iii) a security model of the smart card.

3. The interoperability method of claim 1, wherein the framework comprises a usage management component for enforcing a security model of the smart card at the smart card terminal.

4. The interoperability method of claim 1, wherein the framework comprises an error condition management component for detecting an error of the smart card.

5. The interoperability method of claim 1, wherein the framework comprises a usage management component for creating a secure communication channel between the smart card and the smart card terminal.

6. The interoperability method of claim 1, further comprising
   configuring the smart card terminal application to further define a terminal policy or a restriction.

7. A method of enforcing a security model of a smart card on a smart card terminal, the method comprising:
   obtaining by one or more computer processors the security model of the smart card from a data and management framework of the smart card terminal;
   providing by the one or more computer processors the security model obtained from the data and management framework for developing a smart card terminal application in accordance with the smart card; and
   using the one or more computer processors to generate the smart card terminal application by incorporating the security model obtained from the data and management framework into the smart card terminal application.

8. The method of claim 7, wherein obtaining the security model of the smart card from a data and management framework of the smart card terminal comprises reading an application program interface applied to the data and management framework.

9. The method of claim 7, wherein the framework comprising an error condition management component for:
   detecting an error condition defined by the security model; and
   transmitting an error message corresponding to the error condition upon detection of the error condition.

10. A smart card terminal infrastructure for a smart card terminal, the smart card terminal infrastructure comprising:

a data and management framework;
an interface component within the data and management framework for obtaining information related to a smart card application on a smart card, wherein the information allows for developing a terminal application in accordance with the smart card application, the interface component incorporating the obtained information into the terminal application; and
a communication component within the data and management framework in operative communication with the smart card and the smart card terminal.

11. The smart card terminal infrastructure of claim 10, wherein the information related to the smart card application on the smart card is at least one of (i) an interface of the smart card application; (ii) a protocol used by the smart card application; and (iii) a security model of the smart card.

12. The smart card terminal infrastructure of claim 11, wherein the error condition management component further operates to relay an error message to the communication component upon detection of the error.

13. The smart card terminal infrastructure of claim 12, wherein the communication component relays the error message of the smart card terminal by at least one of (i) displaying the error message on a display device; (ii) creating a log entry corresponding to the error message; and (iii) sending the error message to an application.

14. The smart card terminal infrastructure of claim 10, further comprising:
an error condition management component for detecting an error of the smart card.

15. An interoperability method between a smart card terminal and a smart card application on a smart card, the method comprising:
exposing a data and management framework at a smart card terminal;
receiving, at the data and management framework, an application program interface corresponding to the smart card application;
obtaining by one or more computer processors information related to the smart card application from the application program interface;
providing by the one or more computer processors information obtained from the application program interface for developing a terminal application accordance with the smart card application; and
generating the terminal application by incorporating the obtained information into the terminal application.

16. The interoperability method of claim 15, further comprising:
receiving a communication from the terminal application to the smart card application, wherein said smart card terminal application is developed based on the information obtained from the application program interface;
relaying the communication to the smart card application via a uniform interface to the smart card.

17. The interoperability method of claim 15, wherein obtaining information related to the smart card application from the application program interface comprises obtaining at least one of (i) an interface of the smart card application; (ii) a protocol used by the smart card application; and (iii) a security model of the smart card.

18. A method of enforcing a security model of a smart card on a smart card terminal, the method comprising:
exposing a data and management framework at a smart card terminal;
receiving, at the data and management framework, an application program interface corresponding to the smart card application;
obtaining by one or more computer processors information related to the smart card application from the application program interface, said information comprises the security model of the smart card application;
providing by the one or more computer processors said security model for developing a terminal application in accordance with the smart card application; and
generating the terminal application by incorporating the obtained information into the terminal application.

19. The method of claim 18, further comprising:
detecting an error condition defined by the security model; and
transmitting an error message corresponding to the error condition upon detection of the error condition.

20. The method of claim 18, wherein obtaining the security model of the smart card from the data and management framework of the smart card terminal comprises reading an application program interface applied to the data and management framework.

* * * * *